United States Patent
Burbidge (10) Patent No.: US 7,967,670 B2
(45) Date of Patent: Jun. 28, 2011

(54) SPECIAL VIDEO-GAME SYSTEM FOR LEARNING, ENTERTAINMENT AND ADVERTISING

(76) Inventor: Felix Andrew Burbidge, Market Harborough (GB)

( * ) Notice: Subject to any disclaimer, the term of this patent is extended or adjusted under 35 U.S.C. 154(b) by 1194 days.

(21) Appl. No.: 11/601,833

(22) Filed: Nov. 20, 2006

(65) Prior Publication Data

US 2007/0123328 A1    May 31, 2007

Related U.S. Application Data

(60) Provisional application No. 60/740,548, filed on Nov. 30, 2005.

(51) Int. Cl.
| | |
|---|---|
| A63F 9/24 | (2006.01) |
| A63F 13/06 | (2006.01) |
| A63F 13/10 | (2006.01) |
| A63F 13/00 | (2006.01) |

(52) U.S. Cl. .................. 463/7; 463/9; 463/23; 463/30; 463/37; 273/242; 273/243; 273/317.1; 273/461; 345/473; 345/474; 345/619

(58) Field of Classification Search .................. 463/1–5, 463/7–9, 30–34, 36–39, 40–43, 49–57, 16, 463/19–23; 273/108.1, 127 R, 148 R, 148 B, 273/309, 317.1, 340, 348, 361–367, 138.1, 273/138.2, 139, 141 A, 142 B, 142 C, 142 J, 273/242–243, 460–461; 345/1.1–3.4, 156, 345/157, 160, 419, 473–475, 618–619, 629; 348/37, 119, 141–142, 240.99, E13.022–E13.027, 348/E13.036; 434/115, 117, 118, 211; 715/706, 715/738, 757, 762–764; A63F 13/00, 13/06, A63F 13/10, 9/24

See application file for complete search history.

(56) References Cited

U.S. PATENT DOCUMENTS

| | | | | |
|---|---|---|---|---|
| 4,126,315 A | * | 11/1978 | Tung | 273/271 |
| 4,466,615 A | * | 8/1984 | Yaeger | 273/292 |
| 5,108,109 A | * | 4/1992 | Leban | 273/242 |
| 5,423,556 A | * | 6/1995 | Latypov | 463/9 |
| 5,643,084 A | * | 7/1997 | Mirsky | 463/9 |
| 5,971,395 A | * | 10/1999 | Swift | 273/262 |
| 6,176,487 B1 | * | 1/2001 | Eklund et al. | 273/249 |
| 6,206,372 B1 | * | 3/2001 | Harris | 273/153 S |
| 6,305,688 B1 | * | 10/2001 | Waroway | 273/292 |
| 6,398,641 B1 | * | 6/2002 | Yamagami et al. | 463/9 |
| 6,446,969 B1 | * | 9/2002 | Denoual | 273/261 |
| 6,578,848 B1 | * | 6/2003 | Champion et al. | 273/292 |
| 6,659,464 B1 | * | 12/2003 | Champion et al. | 273/292 |
| 6,938,899 B2 | * | 9/2005 | Kenney et al. | 273/292 |
| 6,983,937 B2 | * | 1/2006 | Levinson | 273/309 |
| 7,077,744 B2 | * | 7/2006 | Cannon | 463/20 |
| 7,195,560 B2 | * | 3/2007 | DeMar et al. | 463/20 |
| 7,294,058 B1 | * | 11/2007 | Slomiany et al. | 463/31 |
| 7,708,627 B2 | * | 5/2010 | Lind | 463/16 |
| 2003/0100355 A1 | * | 5/2003 | Hannay | 463/2 |
| 2005/0017447 A1 | * | 1/2005 | Geshwind | 273/236 |
| 2006/0073863 A1 | * | 4/2006 | Hagiwara | 463/9 |

FOREIGN PATENT DOCUMENTS

GB    2372132 A    *    8/2002

OTHER PUBLICATIONS

Sid Meier, Civilization IV—Sid Meier's Civilization Game, May 30, 2005, Firaxis Games, Version 4, pp. 1-2, http://www.civ4.com/.*

* cited by examiner

*Primary Examiner* — Arthur O. Hall (57) ABSTRACT

The invention is directed to a method and apparatus for a video game system where a player tile is a part of a moving grid or grid-like display and also moves through it. Moves of the player tile may be allowed or disallowed according to the relationship between the design of the player tile and that of other identifiable areas of the display. The designs displayed may have special significance in the field of education or advertising or entertainment. In a variation of the game the objective is to change areas of the display to the same state.

29 Claims, 7 Drawing Sheets

The player chooses between these two states for the state of the player tile.

In some game variants, the movement of the player tile changes tiles, which may involve selection of the new states by the player.

In some games, allowance of movement depends on the state of the player tile

Random changes to tiles can prevent players from achieving their objectives.

SPECIAL VIDEO-GAME SYSTEM FOR LEARNING, ENTERTAINMENT AND ADVERTISING

This application claims priority on Provisional Application Ser. No. 60/740,548, filed, Nov. 30, 2005, titled: 'Special video-game system for learning, entertainment and advertising' by Felix Andrew Burbidge. The contents of Provisional Application Ser. No. 60/740,548 are incorporated herein by reference.

FIELD OF THE INVENTION

The invention is directed to a method and apparatus for a video game system where a player tile is a part of a moving grid or grid-like display and also moves through it. Moves of the player tile may be allowed or disallowed according to the relationship between the design of the player tile and that of other identifiable areas of the display. The designs displayed may have special significance in the field of education or advertising or entertainment. In some variations of the game the objective is to change areas of the screen to the same state, in others it is to select correct moves dependent on the relationship between different visual elements according to various criteria.

BACKGROUND

The playing of video games is a well-known aspect of human interaction with computers with many different objectives and strategies. Through the interaction of the game software with the computing device that runs the game, which may be a personal computer or an arcade game system or a mobile phone or some other computing device, images are made to appear on a screen and may be made to appear to move from place to place, either automatically or under the control of the player. The player has some means of input for control instructions such as a keyboard or a computer mouse.

Different computing devices can be linked by various means, including by means of electric cables, optical fibres or wireless networks as in the internet, mobile phone networks and other networks. On such networks a player may play games in cooperation with or in competition against other players each of whom may be in a separate location.

In the computer game industry there are specific names for the different software components and their visual representations such as are required to produce an image on the screen. Thus, sprites are used to prepare textures which are used to give visual appearances to objects and different instances of objects may be used in any one game possibly with different sprites or textures. Changeable areas of a display are also known as tiles and a player tile, which is moved about under the control of the player, is used in many games.

A playing area may be made of different tiles or of larger areas each sub-divided to give the appearance of separate tiles. In the latter case, the processing would involve keeping account of the position of the player tile on the larger areas and possibly adjusting the appearance of the player tile as necessary and placing additional tiles over the larger areas to represent changes in their visible states. In such a case the game does not necessarily rely on separate tiles to interact with the player tile for each move. However, to make a playable game, identifiable areas of some sort would usually be involved.

One type of video game is where a grid or grid-like display of tiles, representing the opponents in the game, approaches a player tile that is moved by the player so as to cover the different lines of approach and can be made to appear to shoot and destroy them. Typically, points are awarded to players according to their ability. In some games the play is made to speed up making play increasingly difficult and also in some games the player may begin with a certain number of lives that may be lost when wrong moves are made or accidents of one sort or another occur.

Some video games are derived from board games, such as knight-moves, which originated in chess. In knight-moves the knight is moved so that it takes different places on the screen-representation of the chessboard. In contrast to the previous case the player tile in this game can move to cover the whole board step by step.

Although entertaining, the games described above do not lend themselves readily to an educational environment or to advertising.

In view of these considerations, according to the present invention, a computer game system is provided where a player tile is part of a moving grid or grid-like display and can move through it. That allows for a more exciting type of game than a board game and games can be designed with this system that require the player to learn specific facts from the field of education to plan moves depending on the state of the various identifiable areas in the game.

SUMMARY

With the current invention tiles or equivalent visual representations take places in a moving grid or grid-like display which contains at least one player tile. It can be arranged that, while a player tile is moving through the display, with each move it changes an identifiable area of the display to a designated state associated with the player so that the player can surround areas or complete rows to gain points, which may be in competition with another player.

Also moves may only be allowed where what is shown in the design of the player tile relates in a correct way to what is shown in the identifiable areas of the display in the position to which the player tile is to move and that can be the basis for another type of game where the emphasis is on the relationship between the player tile and other identifiable areas. That may involve leaning the truth or falsehood of facts displayed if the player tile must show the correct word from a choice of 'true' or 'false' to be able to move. Scores can be increased for correct moves and reduced for attempting to make incorrect moves.

In some games it may be required of the player to prevent the player tile from being carried to the boundary of the display by the constant movement of the field of identifiable areas such that the player is required to think quickly and learn any factual material represented on them thoroughly to get a good score. The score can then serve as a mark of the player's competence in that area of knowledge.

Interesting features of some games are random changes in the appearance of tiles so that completing areas is more difficult and the application of the changes can increase as the game proceeds as can the speed of the moving display. Gaps would prevent moves and where the game includes that feature the player might be able to place a tile in a gap to continue, which may cost a life. In competition between two or more players, moves may be prevented that would otherwise cause two player tiles to occupy the same space Then players can deliberately impede each other and cause the loss of lives.

In games requiring knowledge of facts associated with the designs of the tiles, the repetition involved in making decisions can reinforce learning including with letter, word or number order, which may be especially valuable for dyslexics and there may be other requirements in games to further increase interest for players.

Application of artificial intelligence to play provides a proving ground for artificial-intelligence programmers and different artificial-intelligence programs and people can play against each other over a network of computers. Games may be of interest to advertisers also, especially where recognition of the designs of products is intricately involved in the play.

BRIEF DESCRIPTION OF THE DRAWINGS

FIG. 2 shows a player tile moving through a grid-like display.

FIG. 3 shows the path of a player tile that has changed the state of tiles as it moved.

FIG. 4 shows the path of a player tile, where the player has a choice of states for the player tile and movement of the player tile is controlled accordingly.

FIG. 5 shows how the player places a Free Move tile in a gap, allowing the player tile to move irrespective of the player tile's state, after which the player tile moves to reach a special tile, labelled ST.

FIG. 6 shows a player tile moving onto tiles having the number order 21, not 12.

FIG. 7 shows where movement of the player tile is controlled according to a cyclic system of precedence; the player must change the player tile after the first two moves, in accordance with the rules of the game, Scissors-Paper-Stone.

FIG. 8 shows two player tiles, PT1 and PT2, each unable to move onto the space occupied by the other.

FIG. 9 shows in two ways how transparencies of tiles make a combined design when the player tile is at different positions.

FIG. 10 shows a player tile at different positions, appearing as though distorted within a crystal.

FIG. 11 shows two player tiles, PT1 and PT2, where PT1 changes tiles to show 1 and thus can make a row of tiles all showing 1; also, movement of the player tiles can be controlled according to their states.

FIG. 12 shows with two different areas how substitution of one area with another in a display can give the appearance of a player tile moving from one position to another.

DETAILED DESCRIPTION

Some video games involve a grid of tiles moving across the screen from one boundary to another and a player tile, controlled by the user, that is moved so as to find a way through the grid by shooting tiles of the grid and destroying them. Although this is proved to hold the user's attention it does not necessarily fit readily into a learning environment or with advertising.

Figure 1:
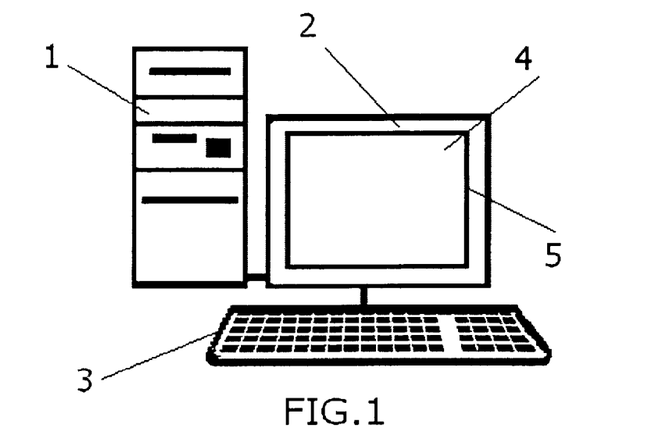
FIG. 1 shows a video game apparatus.
Figure 2:
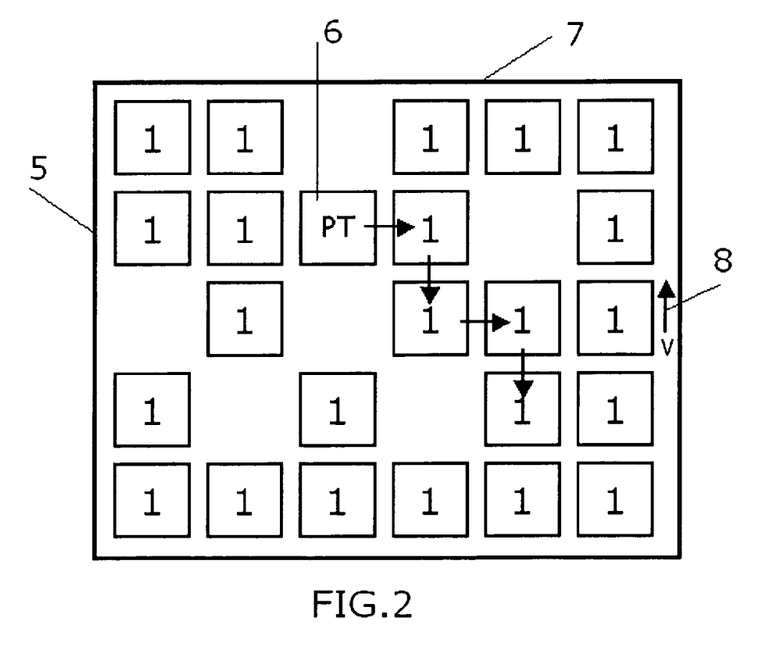
FIGS. 2-12 show views as appearing on the screen of an apparatus as in FIG.1; arrows with the letter, v, indicate the speed of the grid-like display.

With the current invention there is provided a computing device 1, a display screen 2, a control interface 3 (FIG. 1) and software running on the computing device that produce a video game where now, during the playing of the game the player tile 6 (FIG. 2) is a part of the grid and is controlled so that it makes progress through the grid by taking the place of or covering tiles of the grid. The system may have equipment for reproducing sound and other equipment such as is found to be useful or interesting in connection with the playing of video games.

Figure 4:
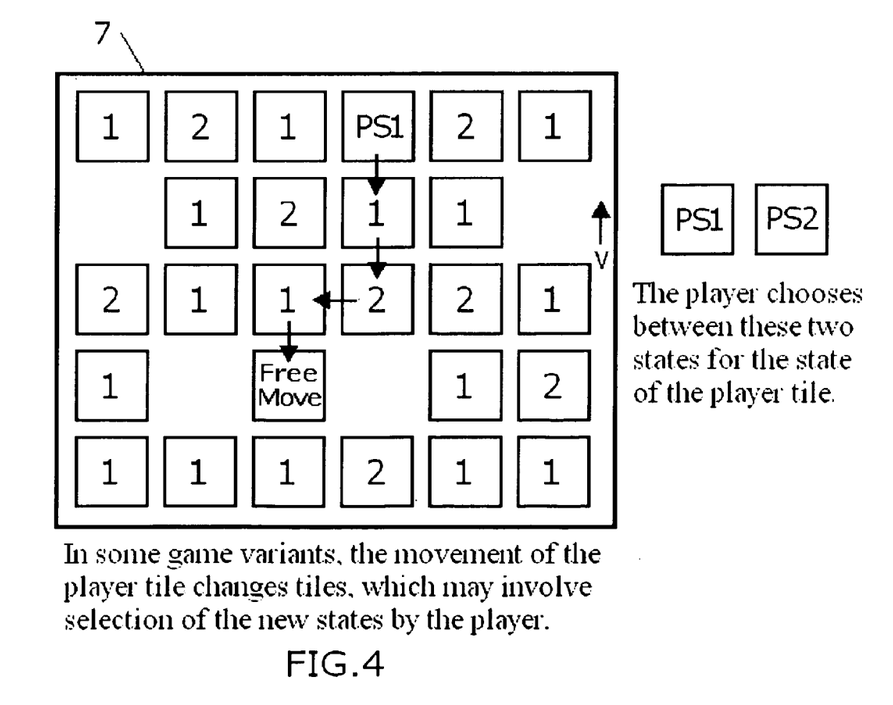

In some variations of the system, the player tile must be in an allowed state to replace or cover tiles of the grid, which can be of various designs in any one game (FIG. 4). The player tile may be moved and changed between different states by using the keys of a keyboard or with some other controlling device. When it moves on to another position the position it is leaving can be left with a grid tile of the same sort that was there when the player tile arrived there or can be left with a different sort. Tiles may be two-dimensional or three-dimensional in appearance.

In some variations of the system the tiles of the grid and the available states of the player tile are chosen by the game designer so that aspects of the user's knowledge and understanding are tested as the user seeks to guide the player tile through the grid.

Although specific examples do not restrict the scope of the invention they may be useful in making the invention clearer.

One example of the invention is where the player tile can be changed so as to show either a left-pointing arrow or a right-pointing arrow and the tiles of the grid have the words 'Left' or 'Right' on them. Use of the system teaches and reinforces knowledge of left and right if progress is only allowed where the arrow direction of the player tile corresponds to the word on the grid tile it is to replace or cover.

Automatic control of the speed of grid tiles 8 (FIG. 2) can be arranged so that it increases until play eventually becomes impossible. Where points are awarded for correct moves and deducted for attempting to move in a way that is not allowed, the total achieved at the end of the game will give an indication of the user's recognition of the aspect of learning concerned.

Since the player tile is part of the grid it may be in the design that a game ends when the user cannot prevent the player tile reaching the boundary of the game area 7 (FIG. 2), thus limiting the thinking time allowed. It may be better only to award points for a move in the opposite direction to the direction of motion of tiles of the grid and to deduct points for moves in the same direction as the direction of motion of tiles of the grid. A player tile may be confined within the visible boundaries 5 of the game area 4 by disallowing moves that would take it outside that area.

Figure 5:
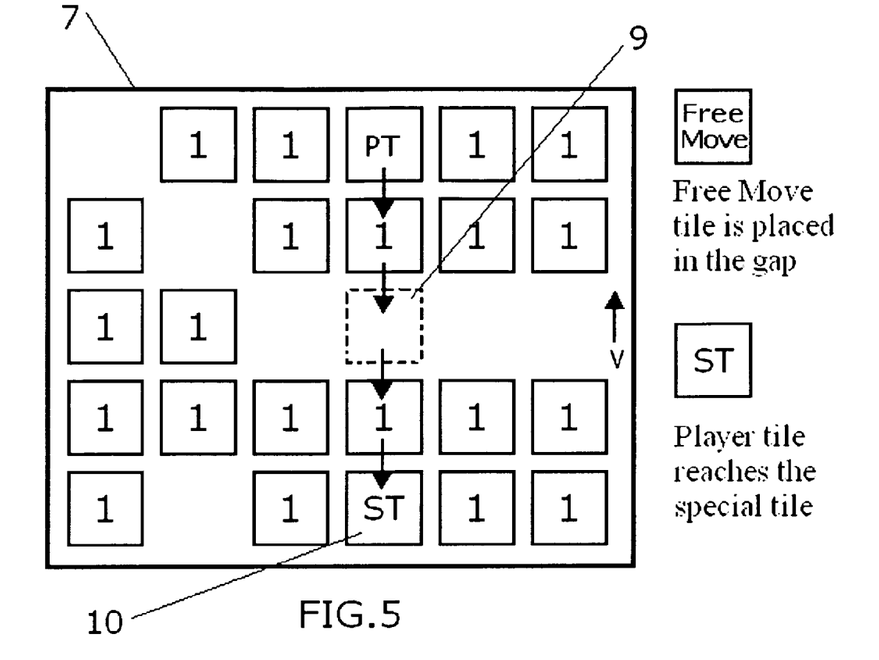
Figure 6:
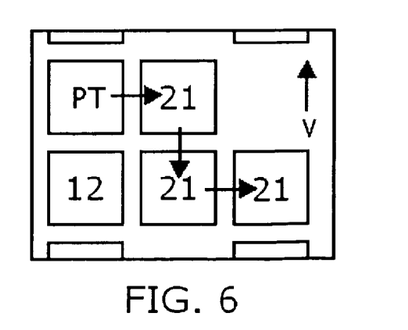

In some variations of the system some of the grid tiles are special tiles that can be replaced or covered by the player tile irrespective of the player tile's state. There can be random gaps in the grid, produced when the grid is assembled by the software so that sometimes no further progress would be possible. Where that is the case the user has a control that allows the placing of a grid tile in a gap 9 (FIG. 5) so as to allow the game to continue. The game can be designed so that such an action removes a life from a player's tally of lives, which may influence the end score. Loss of all lives can be made to cause a premature ending of the game.

Games involving the current invention can be used with many aspects of learning. For example, recognition of letter order in words can be reinforced for a user with dyslexia if the grid tiles display different words, only some of which contain the required letter order and a state of the player tile also shows that same order. Similarly, games can be made requiring knowledge and recognition of word order in sentences. It is believed by some in the field of education that a training regime designed to improve physical coordination can also help dyslexics to improve cognitive abilities and the current invention, since it can be made to require physical coordination that is repeatedly taken to the limit, may be of value in such a learning system.

Figure 7:
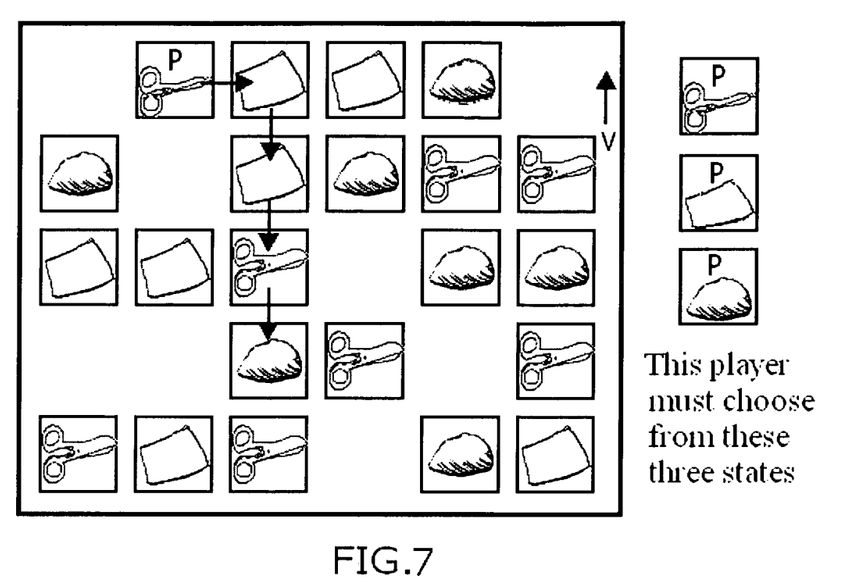

Player tiles and grid tiles can represent the different states of the well-known game, Scissors-Paper-Stone (FIG. 7) where one state has precedence over another and that has precedence over the next, which has precedence over the first, in a cyclic relationship. Thus, a player tile showing a picture of paper could cover or replace a grid tile showing stone and a player tile showing stone could cover or replace one showing scissors but a player tile showing paper could not cover or replace one showing scissors, for example.

Another example using cyclic precedence is where the player tiles and the grid tiles show the colors of the rainbow and a player tile can only cover or replace a grid tile that shows the next color in the sequence of colors of the rainbow while a player tile showing the last color in the sequence can only cover or replace a grid tile showing the first color. In this variation of the system, a grid tile showing a rainbow might be replaced or covered by a player tile irrespective of the player tile's state.

To make the format more appealing, one or more extra layers of moving tiles can be incorporated into the design and any tile in the game might be animated.

Figure 8:
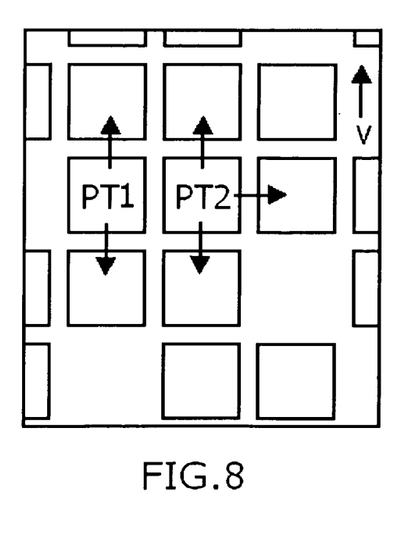

A game may be played as a competition between two or more players (FIG. 11), each with a player tile. Moves can be disallowed that would move a player tile into a space already occupied by another player tile (FIG. 8). The winner might be the one who retains his lives the longest or who is able to prevent his player tile from reaching the boundary of the game area for longer than the other player or players. Adjustments might be made to scores depending on lives left at the end of a game to decide the winner.

Artificial intelligence may be incorporated in the software to control one or more of the tiles in a multi-player game. Different artificial-intelligence software systems can also be run against each other, eliminating the need for human players. The system can be used for developing and testing artificial intelligence and as the basis for a competition between software developers.

Games using the current invention might be played by players, whether human or artificial-intelligence software, from different computers of a network of computers such as the internet, for example.

While a game is running, special tiles 10 can be introduced by the software somewhere in the layers of tiles, allowing players to gain extra points by reaching them, for example. It can be so arranged that where a player loses a life in moving toward such a special tile, if it is reached within a certain number of moves the lost life is restored. Reaching the special tiles might represent in some way the doing of a good deed, for example. The special tiles might be programmed to escape by moving away from an approaching player tile including by moving behind gaps in the grid, for example. A special sound might play automatically when they have escaped and there might be sounds at other times during play to provide more interest for players.

Figure 9:
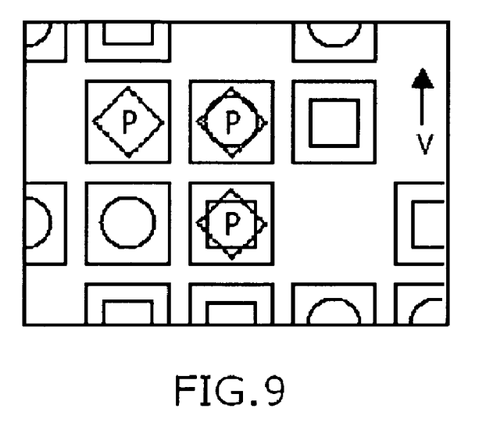

In variations of the system where a player tile covers rather than replaces a grid tile, their transparencies might be arranged so that when they overlap, their combined design is recognizably different from that of either of them alone (FIG. 9). Such differences might be of shape or color or both. Producing certain shapes or colors might be an objective of the game.

Clicking on a tile using a computer mouse can be arranged to cause an information window to open giving information related to the subject matter and it can make a sound play, which might give information related to the subject matter or might be pronunciation of words or parts of words involved in learning or other interesting sounds.

Games relying on the system, though designed for learning, may be very entertaining and even when designed for entertainment can reinforce aspects of recognition of qualities useful in learning.

Tiles may be rectangular or other shapes. Although the directions, Up, Down, Left and Right, may often be used for control of movement for rectangular tiles, movement along diagonals might be possible and where tiles are of some shape other than rectangular other possibilities for the directions of motion might be designed into a game. For example, where triangular tiles are used, moves might be allowed perpendicular to the sides of the triangles. Similarly, with hexagonal tiles, moves might be allowed perpendicular to the sides of the hexagons.

Figure 10:
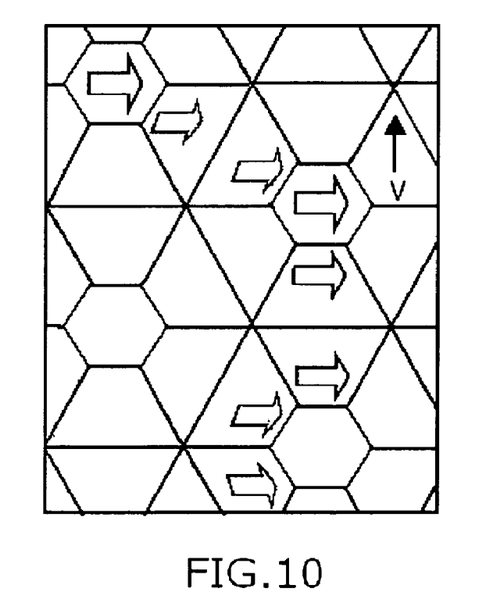

Tiles may have the appearance of crystals where not all faces are the same shape. A player tile might change shape as it moves through an array of crystal-like tiles, possibly appearing somewhat distorted as an object might appear when seen within a crystal (FIG. 10).

Figure 13:
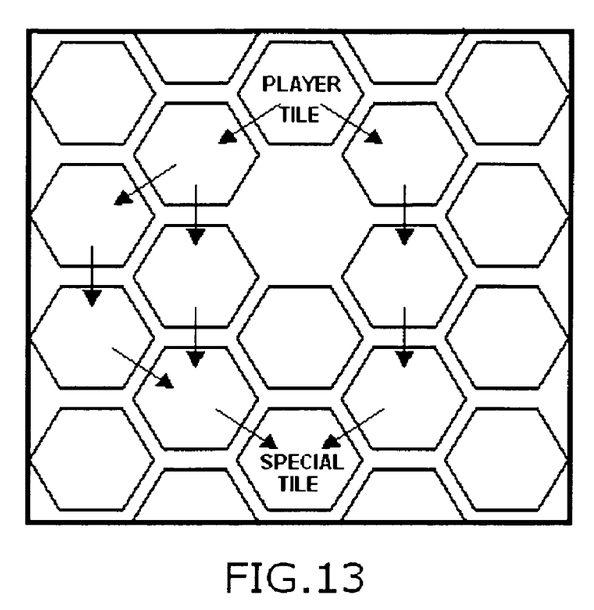
FIG. 13 shows how, where a player tile changes state automatically between two states with each move, a route must be planned for the player tile to be in a desired state when it arrives at the desired position since the number of moves can be odd or even.

The system can be designed so that when a player tile moves, it automatically switches to another state or so that it always remains in the same state until changed by the player. In variations of the system where a player has no control of the state of a player tile other than with movement of the tile from place to place, it might be necessary for the player to plan a route so that the number of changes made in moving from one place to another leaves the player tile in a desired state when it arrives at some desired position (FIG. 13).

The state of a player tile might be changed by use of keys of a keyboard where each possible state of the tile is chosen by the use of a designated key or the player tile might be made to cycle through different states with the repeated use of only one key. A player tile might be made to cycle through different states with repeated clicking of a computer mouse, for example, or by means of some other control system.

Grid tiles may have true or false statements on them with 'True' and 'False' on the states of the player tile, for example, or other words to indicate relevant choices so that the player gains or loses points depending on their knowledge. The statements on the grid tiles may be of possibilities other than simply 'True' or 'False' and the player tiles may have appropriate choices such that categories of different sorts must be recognized, for example.

The system can be used to train a person where choices presented on the grid tiles reflect choices between legal and illegal behavior or between acceptable and unacceptable behavior or procedures, with corresponding pairs of states on the player tile.

Grid tiles can have pictures and a player tile can have one of a pair of words reflecting an aspect of what is represented by the pictures, such as 'Metal' and 'Plastic' or 'Animate' and 'Inanimate' or any number of other pairs relevant to grid tiles, so that the player is trained in distinguishing different qualities of the material world. Similarly, abstract ideas can be used. Instead of single words, statements of more than one word might be used.

The system can be used with items from the field of mathematics such as equations, symbols, operations or shapes, for example.

In some variations of the system, player tiles can change the state of a tile of the grid when that grid position is reached so that when the player tile moves on, the grid tile is different from how it was when the player tile arrived. That can be done automatically or by the player when the player tile is at the required position by use of a keyboard or computer mouse or other control system.

Figure 3:
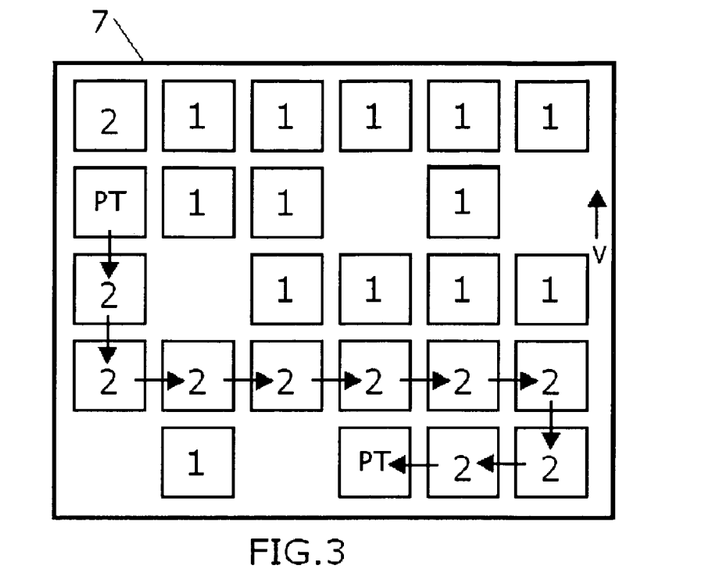
Figure 11:
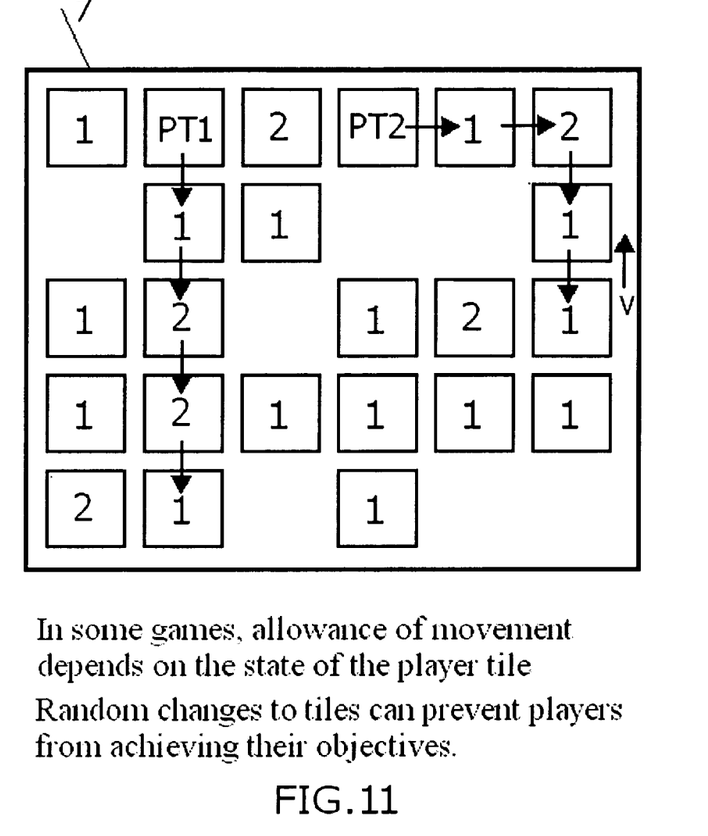

Points might be awarded for changing all the tiles of a row of the grid to the same state, for example (FIG. 3). A random effect can be applied such as by objects of some sort appearing to fall on the grid, for example, such that grid tiles are changed from time to time so as to make it more difficult to complete a row and the number of falling objects per unit time can be increased as the game progresses. This can be played as a solo game or with multiple player tiles, any of which may be controlled with artificial intelligence. Different players could compete to change tiles to a designated state, different for each player (FIG. 11). With these variations of the system another possible objective of the play can be to surround areas of the grid by changing all tiles of a perimeter of an area of the grid to the same state such that the total number of tiles surrounded counts to the score of the player achieving it.

With many different variations of the system, because moves can be disallowed when a player tile would move to a position already occupied by another player tile, it is possible for one player tile to trap another and prevent it from escaping contact with the boundary of the game area, or force the loss of a life as the trapped tile escapes.

Variations of the system where it is required to match states of the player tile with the properties of the grid tiles can be used with very many aspects of learning and other variations of the system can have educational value also.

Further educational benefits inherent in the system are:
it is easy to begin to use the system; it can engage a student's emotions because of a need to avoid wrong choices and achieve a high score, reinforced with use; it can strengthen motivation for what might otherwise not be of much interest to a student; feedback to a student is instantaneous; feedback to a teacher is readily available since more knowledge will show clearly in higher scores; it can be more economical than multi-choice testing using paper; assessment of achievement can be made secure because no cheating is possible where a teacher can see the student work; friendly competition can arise between students, increasing motivation further; a greater rate of learning may be achieved than with traditional methods; stronger reinforcement of learning is possible, with letter order, word order and number order recognition for dyslexics, for example; the system can be used silently allowing many students to use the same space; scores can be saved to a file so that a teacher can access an individual's scores and suggest further work.

Tiles can show designs associated with companies or their products and the game play can be designed so as to be of value in promoting companies or their products. It can reflect choices in various aspects of life including those of interest to commerce. One example is the choice between less healthy or more healthy types of food, for example.

Figure 12:
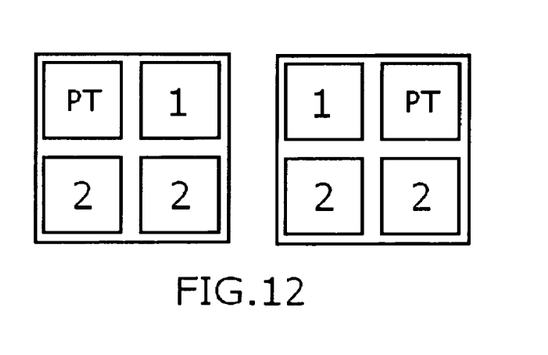

Games can be designed where no player tile is necessary and the impression of movement of an object through the grid is achieved by changing grid tiles or the appearance of grid tiles (FIG. 12).

Instead of a grid a continuous moving field of identifiable areas can be used giving a game system essentially the same in character as if a grid is used.

What has been described is a game with different variations possible that are of value in education, advertising and entertainment, with (i) apparatus, (ii) game software, (iii) moving displays of identifiable areas (iv) keyboard or other controls (v) an application involving a network of computing devices. Although the present invention has been described in considerable detail with respect to certain preferred versions thereof, other versions are possible. Therefore, the spirit and scope of the appended claims should not be limited to the descriptions of the preferred versions contained herein.

What is claimed is:

1. A video game apparatus comprising:
a computing device, wherein the computing device is configured to be controlled by software,
a display screen, and
a control interface,
wherein the computing device executes a video game that has a plurality of objectives of a player, the objectives involving movements of a plurality of identifiable areas of a grid-like display across the display screen and movements of a player tile that is guided through the grid-like display under the control of the player by means of the control interface,
wherein said identifiable areas each have a state produced by showing one of a plurality of designs as at least one of:
i) a picture;
ii) a letter;
iii) a number;
iv) a shape;
v) a symbol;
vi) an animation; and
vii) a combined design produced by combining the player tile with the identifiable area of the grid-like display to which the player tile has been moved,
wherein a state of the player tile is chosen from one of the plurality of designs,
wherein the identifiable areas form a game area that is bounded by a boundary of the display screen,
wherein the player tile is a part of the grid-like display and progresses by taking places of the identifiable areas of the grid-like display,
wherein the speed with which the player tile and the grid-like display move is controlled automatically by the computing device, said speed not being controlled by the player, and
wherein at least one other of the plurality of objectives of the game is that the player prevents the player tile from reaching the boundary of the game area while the speed is controlled automatically.

2. The claim as in 1, wherein an identifiable area of the grid-like display is left in a different state to that which the identifiable area was in when the player tile arrived at the position of the identifiable area when the player tile moves on from the position, and one other of the objectives of the player is to change areas of the grid-like display to a designated state.

3. The claim as in 2, wherein there is one of two additional objectives: (i) to surround areas of the grid-like display with a perimeter of identifiable areas such that the identifiable areas of the perimeter are all in the same state; and (ii) to change the identifiable areas of rows of the grid-like display to the same state.

4. The claim as in 2, wherein there are more than one player, each with a player tile and the players compete to change identifiable areas of the grid-like display to a designated state that is different for each player.

5. The claim as in 2, wherein a random effect is applied such that a plurality of the identifiable areas of the grid-like display are changed from time to time so as to make more difficulty for the player in changing tiles of an area of the grid-like display to a designated state.

6. The claim as in 2, wherein the ability of the player tile to move depends in at least a portion of time during the video game on the relationship between the player tile's design and one of a plurality of designs appearing in the identifiable area to which the player tile is to be moved.

7. The claim as in 6, wherein at least one of the identifiable areas of the grid-like display does not disallow the movements of the player tile no matter what state the player tile is in.

8. The claim as in 1, wherein the ability of the player tile to move depends on the relationship between the player tile's design and the state of the identifiable area to which the player tile is to be moved, and the player changes the player tile between different states so as to select a state that allows the player tile to move.

9. The claim as in 8, wherein at least one of the identifiable areas of the grid-like display does not disallow the movements of the player tile no matter what state the player tile is in.

10. The claim as in 8, wherein the game is provided to reinforce recognition of at least one of: i) letter order; ii) word order; and iii) number order.

11. The claim as in 8, wherein to be able to make a correct choice of a move of the player tile, the player must change the state of the player tile according to one of a plurality of types of knowledge including knowledge of: (i) pictures displayed and statements related to the pictures; (ii) objects of the material world and descriptions of those objects; (iii) qualities of the material world and descriptions of those qualities; (iv) properties of the material world and descriptions of those properties; (v) abstract ideas and words that represent them; (vi) correctness of statements; (vii) words that indicate correctness; (viii) words that indicate incorrectness; (ix) symbols that indicate correctness; (x) symbols that indicate incorrectness; (xi) representations of acceptable behavior; (xii) representations of unacceptable behavior; (xiii) representations of acceptable procedures; (xiv) representations of unacceptable procedures; (xv) mathematical words and their significance; (xvi) changes of shape; (xvii) mathematical symbols and their significance; (xviii) order of letters in words; (xix) order of words; (xx) order of numbers; (xxi) characteristics of language; and (xxii) the meaning of symbols used in the display.

12. The claim as in 11, wherein the state of an identifiable area of the grid-like display that was evident when the player tile arrived at the identifiable area is left changed when the player tile has moved on from the identifiable area.

13. The claim as in 12, wherein an objective of the player is to change identifiable areas of the grid-like display to a designated state.

14. The claim as in 8, wherein an identifiable area of the grid-like display at which the player tile arrives is left in a state different to the state that identifiable area had immediately before the arrival of the player tile when the player tile moves on from that identifiable area, and there are more than one player, each player having a player tile and the players compete to change a plurality of the identifiable areas of the grid-like display to a designated state that is different for each player.

15. The claim as in 1, wherein the speed of identifiable areas of the grid-like display increases by automatic control and the game ends when the player cannot prevent the player tile from reaching the boundary of the game area.

16. The claim as in 1, wherein there are random gaps in the grid-like display that prevent further progress of the player tile and the player places an additional identifiable area in one of the random gaps by means of the control interface thus allowing play to continue.

17. The claim as in 1, wherein the state of the player tile and the states of a plurality of the other identifiable areas of the grid-like display are related to one another in a cyclic system of precedence.

18. The claim as in 16, wherein there are more than one player, each player having a player tile.

19. The claim as in 18, wherein moves that would move one of the player tiles into a space already occupied by another of the player tiles are disallowed.

20. The claim as in 18, wherein the game is used for a competition between software developers.

21. The claim as in 18, wherein players play from different computing devices in a network of computing devices.

22. The claim as in 16, wherein a special tile is introduced in the game area and the player gains extra points by causing the player tile to reach the special tile.

23. The claim as in 1, wherein the identifiable areas show designs associated with companies.

24. The claim as in 1, wherein two of the identifiable areas overlap and the transparencies of the identifiable areas are such that the combined design of the two identifiable areas is recognizably different from that of the overlapping areas when seen alone.

25. The claim as in 1, wherein there is an array of identifiable areas that are crystal-like in appearance and the player tile appears to move through the array, and wherein the player tile changes in appearance so as to appear distorted as though seen within a crystal.

26. The claim as in 1, wherein the player tile changes state with each move so that a route is planned to achieve a result that a number of changes made by the player tile in moving from one place to another leaves the player tile in a desired state when the player tile arrives at a desired position.

27. The claim as in 1, wherein there are different states available for the player tile and each state of the player tile is changed in one of a plurality of ways including: (i) by use of keys of a keyboard and wherein each possible state of the tile is chosen by the use of a designated key; (ii) by being made to cycle through different states with the repeated use of only one key of a keyboard; (iii) by being made to cycle through different states with repeated clicking of a computer mouse; and (iv) by means of another game control system.

28. The claim as in 1, wherein a score from the playing of the game is used by a teacher to assess the player's knowledge and understanding.

29. The claim as in 16, wherein an impression of movement of the player tile through the grid-like display is achieved by changing identifiable areas of the grid-like display.

\* \* \* \* \*